United States Patent Office 3,111,521
Patented Nov. 19, 1963

3,111,521
2-ARYL-N-(POLYAMINO-5-PYRIMIDINYL)-GLYCINONITRILES
Milton Louis Hoefle and Ann Holmes, both of Ann Arbor, Mich., assignors to Parke, Davis & Company, Detroit, Mich., a corporation of Michigan
No Drawing. Filed Apr. 25, 1962, Ser. No. 189,966
9 Claims. (Cl. 260—256.4)

The present invention relates to novel pyrimidinyl glycinonitrile compounds and means for producing the same. More particularly, the invention relates to 2-benzyl-N-(4,6-diamino-5-pyrimidinyl)glycinonitrile, 2-phenyl-N-(4,6-diamino-5-pyrimidinyl)glycinonitrile, and 2-substituted - N - (2,4,6 - triamino - 5 - pyrimidinyl)-glycinonitriles having in free base form the formula

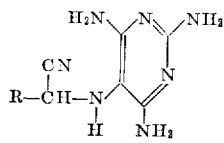

and acid addition salts thereof, where R represents phenyl, (lower)alkylphenyl, (lower)alkoxyphenyl, halophenyl or benzyl, or a lower alkyl group containing 2 to 4 carbon atoms. The terms "(lower)alkylphenyl" and "(lower)alkoxyphenyl" as used herein refer to phenyl groups containing a 1 to 4 carbon alkyl or alkoxy substituent.

According to one embodiment of the invention, 2-phenyl - N - (4,6-diamino-5-pyrimidinyl)glycinonitrile and 2-phenyl and substituted phenyl-N-(2,4,6-triamino-5-pyrimidinyl)glycinonitriles are produced by reacting hydrogen cyanide with 4,6-diamino-5-benzylideneaminopyrimidine or a 2,4,6-triamino-5-benzylideneaminopyrimidine of formula

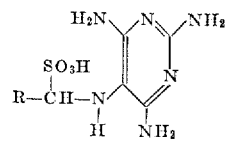

where R' represents a phenyl, (lower)alkylphenyl, (lower)alkoxyphenyl or halophenyl group. The reaction is advantageously carried out in an inert aqueous or non-aqueous medium, i.e. a medium which does not react with the pyrimidine starting material. Hydrogen cyanide is supplied to the reaction medium in any convenient form such as hydrogen cyanide gas or it may be generated in situ. For example, the pyrimidine starting material can be dissolved or suspended in acetic acid or formic acid and the hydrogen cyanide generated in situ by the addition of a cyanide compound such as sodium cyanide, potassium cyanide or ammonium cyanide. Also, the pyrimidine starting material can be dissolved or suspended in a liquid medium such as a lower alkanol or tetrahydrofuran or dimethylformamide, and the hydrogen cyanide introduced in gaseous form. Conveniently, to facilitate the reaction, an excess of hydrogen cyanide is employed. The reaction proceeds readily at room temperature and higher temperature up to about 100° C. For best results, the reaction is carried out below 60° C. over a period of about 5 to 24 hours.

According to another embodiment the compounds of the invention are produced by reacting α-[(4,6-diamino-5-pyrimidinyl)amino]-α-toluenesulfonic acid, 1-[N-(4,6-diamino - 5 - pyrimidinyl)amino] - 2 - phenylethanesulfonic acid, or a substituted N-(2,4,6-triamino-5-pyrimidinyl)aminomethanesulfonic acid of formula

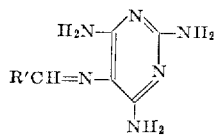

with a water-ionizable cyanide compound in the presence of an aqueous basic medium; where R has the significance specified above. Various cyanide compounds can be employed for the reaction. In general, any compound which will ionize in water to provide cyanide ion will be suitable. For example, one can employ hydrogen cyanide, ammonium cyanide, alkali metal cyanides, alkaline earth metal cyanides and the like. The alkali metal cyanides such as sodium and potassium cyanide are preferred. In carrying out the reaction, the proportion of reactants is not critical, but for best results equivalent quantities of the sulfonic acid and cyanide compound are employed. As an aqueous medium, water or a mixture of water with a water-miscible organic solvent is employed, such as methanol, ethanol, tetrahydrofuran or dimethylformamide. As indicated, the medium employed for the reaction is basic. For purposes of the invention, the aqueous medium contains an amount of base at least sufficient to neutralize the sulfonic acid compound and, so constituted, is defined herein as "aqueous basic medium." For this purpose, various basic compounds can be employed including ammonia inorganic bases such as alkali metal hydroxides and alkaline earth metal hydroxides and organic bases such as pyridine. Also suitable are the basic cyanides which desirably provide both the required basicity as well as the cyanide ion, such as sodium cyanide and potassium cyanide. Conveniently, the reaction is carried out at room temperature, i.e. temperatures in the range from about 20 to 30° C. Ordinarily, at these temperatures the reaction is complete in three to five hours or less. If desired, the reaction can be carried out at higher temperature for shorter periods of time.

Also according to the invention, 2-phenyl-N-(4,6-diamino-5-pyrimidinyl)glycinonitrile and 2-phenyl and substituted phenyl-N-(2,4,6-triamino-5-pyrimidinyl)glycinonitriles are produced by reacting a polyaminopyrimidine compound having in free base form the formula

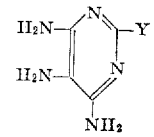

with a substituted cyanhydrin compound of formula R'CH(OH)CN in an aqueous water-miscible organic solvent; where Y is hydrogen or amino (—NH₂) such that where Y represents hydrogen R' is a phenyl group and where Y is an amino group R' is a phenyl, (lower)alkylphenyl, (lower)alkoxyphenyl or halophenyl group. In carrying out the reaction, the polyaminopyrimidine compound can conveniently be supplied to the reaction mixture in free base form in a suitable water-miscible organic solvent or in acid addition salt form such as the bisulfite salt in aqueous solution containing an equivalent amount of potassium or sodium cyanide. The relative amounts of reactants can be varied considerably, but for best results equimolar quantities are used. Any organic solvent which contains, or is miscible with, water and which does not adversely affect the reaction can be used. For example, mixtures of water and lower alkanols, 2-ethoxyethanol, tetrahydrofuran or dimethylformamide are satisfactory. The reaction proceeds satisfactorily at room temperature but is favored by heating. Temperatures in the range from 25 to 80° C. are preferred; at lower temperature the reaction time is unduly long whereas at higher temperature there is a tendency toward decomposition of the desired product. The time required for complete reaction varies, in the range of 25 to 80° C., from five minutes to three hours or longer. For best results, temperatures in the range from 50 to 70° C. are employed.

The compounds of the invention possess diuretic activity. They are effective when administered orally and, in general, their action is selective for the excretion of sodium. Hence, the compounds have application in suitable dosage form as diuretic agents. The preferred compounds of the invention from the standpoint of their outstanding diuretic activity are 2-phenyl-N-(2,4,6-triamino-5-pyrimidinyl)glycinonitrile, 2-(p-methoxyphenyl)-N-(2,4,6-triamino-5-pyrimidinyl)glycinonitrile, 2-(p-isopropylphenyl) - N - (2,4,6 - triamino - 5 - pyrimidinyl)glycinonitrile and 2 - benzyl - N - (2,4,6 - triamino-5-pyrimidinyl) glucinonitrile and pharmaceutically acceptable acid addition salts thereof.

For purposes of the invention, the compounds can be employed as free bases or as the corresponding acid addition salts formed by admixture of the base with an inorganic or organic acid. The acid addition salt form is preferred where increased stability and water-solubility are preferred. The invention contemplates the salts broadly, including such salts as the hydrochloride, hydrobromide, sulfate, citrate, acetate, malate, maleate, gluconate and ascorbate. Salts which are unsuited to particular uses, as for example uses where toxicity is a problem, are nevertheless useful as intermediates since they are readily convertible to the free base or to nontoxic or pharmaceutically acceptable acid addition salts by treatment with an alkaline agent such as sodium hydroxide or by treatment with such an agent followed by reaction with the desired acid, respectively.

The polyamino-5-arylideneaminopyrimidine starting materials for the invention can be prepared by refluxing equivalent amounts of the polyamino-5-aminopyrimidine and the respective aromatic aldehyde in an aqueous water-miscible organic solvent such as aqueous alcohol. The substituted (polyamino-5-pyrimidinyl)amino methanesulfonic acid starting materials of the invention can be prepared by treating polyamino-5-arylideneaminoprimidine with an excess of aqueous sodium bisulfite solution or by reacting at 40–50° C. a polyaminopyrimidine bisulfite in the presence of aqueous alkali with the addition product of sodium bisulfite and the appropriate aromatic or aliphatic aldehyde.

The invention is illustrated by the following examples.

Example 1

2,4,6-triamino-5-benzylideneaminopyrimidine (18.5 g.) is dissolved in a solution of glacial acetic acid (80 ml.) and water (20 ml.), and sodium cyanide (6.5 g.) is added to the solution. The mixture is allowed to stand for 16 hours. The solid acid addition salt product which separates, 2 - phenyl - N - (2,4,6-triamino-5-pyrimidinyl)-glycinonitrile monoacetate, is collected by filtration, washed with cold water (20 ml.) and dried, M.P. 160–164° C. The corresponding free base product is prepared by neutralizing an aqueous solution of the acid addition salt with cold dilute ammonium hydroxide solution and collecting and drying the precipitate which separates out; M.P. 153–155° C. A monohydrochloride salt of the free base is obtained by treating a warm solution of the free base in absolute ethanol with an excess of dry hydrogen chloride gas, cooling the mixture and collecting the product which separates on standing.

The above benzylideneaminopyrimidine starting material can be prepared as follows: 2,4,5,6-tetraaminopyrimidine bisulfite (22.4 g.) is dissolved in a solution of 8.0 g. of sodium hydroxide in 100 ml. of water, and a solution of benzaldehyde (10.5 g.) in 95% ethanol (50 ml.) is added. The resulting solution is heated at reflux temperature for 5–10 minutes and is then cooled. The solid which separates, 2,4,6-triamino-5-benzylideneaminopyrimidine, is collected and dried; M.P. 163–164° C.

By the same procedure, the following 2,4,6-triamino-5-arylideneaminopyrimidines can be prepared starting with the following quantities of the respective aldehydes and in each case an equimolar quantity of 2,4,5,6-tetraaminopyrimidine bisulfite.

| 5-arylidene group | M.P.,° C. | Quantity of Aldehyde, grams |
|---|---|---|
| p-methoxybenzylidene | 225–227 | 11.6 |
| p-isopropylbenzylidene | 179–182 | 14.8 |
| p-tolylidene | 188–190 | 24 |
| m-tolylidene | 159–160 | 21 |
| p-chlorobenzylidene | 168–169 | 14 |
| m-chlorobenzylidene | 187–188 | 14 |
| p-chlorobenzylidene | 169–170 | 14 |

Example 2

2,4,6 - triamino-5-(p-methoxybenzylideneamino)pyrimidine (15 g.) is dissolved in a solution of glacial acetic acid (80 ml.) and water (25 ml.). Sodium cyanide (5.5 g.) is added and the solution is allowed to stand at 25° C. for 12 hours. The product, 2-(p-methoxyphenyl)-N-(2,4,6-triamino - 5 - pyrimidinyl)glycinonitrile monoacetate, which separates in crystalline form is collected by filtration; M.P. 140–141° C. after recrystallization twice from absolute ethanol.

Example 3

2.5 g. of sodium cyanide is added to an aqueous slurry of α-[N - (2,4,6-triamino-5-pyrimidinyl)amino]-α-toluenesulfonic acid [prepared by cooling a solution formed by stirring and warming to 45–50° C. an admixture of 2,4,6-triamino-5-benzylideneaminopyrimidine (4.6 g.) with a solution of sodium bisulfite (4.2 g.) in water (40 ml.)] and the resulting clear solution is allowed to stand at room temperature for approximately 15 minutes. The solid product which separates, 2-phenyl-N-(2,4,6-triamino-5-pyrimidinyl)glycinonitrile, is collected and dried; M.P. after recrystallization from 95% ethanol, 153–155° C.

Example 4

Sodium cyanide (1.42 g.) is added to a solution of α-[N-(2,4,6-triamino - 5 - pyrimidinyl)amino]-α-(p-isopropyl)-toluenesulfonic acid [prepared by dissolving 2,4,6-triamino - 5 - (p-isopropylbenzylideneamino)pyrimidine (7.8 g.) and sodium bisulfite (4.47 g.) in 100 ml. of water]. The resulting mixture is allowed to stand for one-half hour and is cooled. The crystalline product which separates, 2-(p-isopropylphenyl)-N-(2,4,6 - triamino - 5 - pyrimidinyl)glycinonitrile, is collected by filtration and dried; M.P. 179–182° C.

Example 5

Sodium cyanide (5.06 g.) is added to a solution of α-[N-(2,4,6-triamino-5-pyrimidinyl)amino] - α - (m - methyl)-toluenesulfonic acid obtained by heating to 70° C. a mixture of 2,4,6 - triamino-5-(m-tolylideneamino)pyrimidine (24.9 g.) and sodium bisulfite (16.1 g.) in 100 ml. of water. The solution is allowed to stand until a precipitate forms (5–10 minutes). The product, 2-(m-tolyl)-N-(2,4,6-triamino-5-pyrimidinyl)glycinonitrile is recovered by filtration and dried under vacuum; M.P. 159–160° C. By substituting 2,4,6 - triamino - 5 - (p - tolylideneamino)pyrimidine for the meta isomer, one obtains by this procedure 2-(p - tolyl) - N - (2,4,6 - triamino - 5 - pyrimidinyl)glycinonitrile; M.P. 188–190° C. after recrystallization from ethanol.

*Example 6*

Sodium cyanide (3.89 g.) is added to a solution of α-[N-(2,4,6 - triamino - 5 - pyrimidinyl)amino]-α-(p-chloro)toluenesulfonic acid obtained by heating to 70° C. a mixture of 2,4,6 - triamino - 5 - (p - chlorobenzylideneamino)pyrimidine (20.8 g.) and sodium bisulfite (12.5 g.) in 150 ml. of water. The solution is held for 16 hours, and the solid product which forms, 2-(p-chlorophenyl)-N-(2,4,6-triamino-5-pyrimidinyl)-glycinonitrile, is collected by filtration and dried; M.P. 168–169° C.

The corresponding 2-(m-chlorophenyl)- and 2-(o-chlorophenyl) - N - (2,4,6 - triamino - 5 - pyrimidinyl)glycinonitriles, melting respectively at 187–188° C. and 169–170° C., are obtained by this same procedure using in place of 2,4,6-triamino - 5 - (p-chlorobenzylideneamino)pyrimidine the corresponding m-chloro and o-chloro isomers. Similarly, the corresponding o-, m- and p-isomers of 2-bromophenyl - N - (2,4,6 - triamino - 5 - pyrimidinyl)glycinonitrile can be prepared from the corresponding isomers of 2,4,6-triamino-5-(bromobenzylideneamino)pyrimidine.

*Example 7*

4,5,6-triaminopyrimidine sulfate (11.2 g.) is dissolved in 60 ml. of water containing 4 g. of sodium hydroxide, and benzaldehyde (5.5 ml.) in 40 ml. of ethanol is added. The mixture is heated at steam bath temperature for ¾ hour, cooled and filtered. One and one-half grams of the solid product 4,6 - diamino - 5 - benzylideneamino-pyrimidine (M.P. 201–203° C. after recrystallization from 95% alcohol), is heated to 60° C. with 3 g. of sodium bisulfite in water (20 ml.) and the resulting clear solution is cooled. To the slurry of α-[N-(4,6-diamino-5-pyrimidinyl)amino]-α-toluenesulfonic acid which separates is added a solution of 2 g. of sodium cyanide in water (10 ml.). The mixture is warmed to 50° C., cooled, and the solid product which separates is collected by filtration and dried. This product is 2 - phenyl - N - (4,6 - diamino - 5 - pyrimidinyl)glycinonitrile; M.P. 148–150° C.

*Example 8*

Benzaldehyde (5.2 g.) is added to a solution of sodium bisulfite (10.4 g.) in water (30 ml.) and the mixture is stirred for 10 minutes at 60° C. To the resulting mixture which contains α-hydroxy-α-toluenesulfonic acid, sodium salt, is added an aqueous solution of 2,4,5,6-tetraminopyrimidine prepared by forming a solution of 2,4,5,6-tetraaminopyrimidine bisulfite in 40 ml. of water plus 4.0 g. of sodium hydroxide. The resulting solution is heated for about ten minutes at 40–45° C. and is then cooled. Sodium cyanide (6.0 g.) is added with stirring to the resulting slurry of crystalline α-[N-(2,4,6-triamino-5-pyrimidinyl)amino]-α-toluenesulfonic acid. The clear solution which forms is allowed to stand at room temperature until a crystalline product separates. This product, 2-phenyl-N-(2,4,6-triamino-5-pyrimidinyl)glycinonitrile, is collected and dried.

*Example 9*

A mixture of phenylacetaldehyde (10 g.), sodium bisulfite (10.4 g.) and water (40 ml.) is heated for 10 minutes and filtered. The cooled filtrate containing 1-hydroxy-2-phenylethanesulfonic acid, sodium salt, is added to a solution of 11.1 g. of 2,4,5,6-tetraaminopyrimidine bisulfite in 25 ml. of water containing 2.0 g. of sodium hydroxide, and allowed to stand for three hours. The product which separates, 1-[N-(2,4,6-triamino-5-pyrimidinyl)amino]-2-phenylethanesulfonic acid, is removed by filtration and suspended in water (80 ml.). Sodium cyanide (5.5 g.) is added to the suspension and, following complete solution, the crystalline product which separates on standing is removed by filtration and recrystallized from ethanol. The product is 2-benzyl-N-(2,4,6-triamino-5-pyrimidinyl)glycinonitrile; M.P. 175–178° C.

*Example 10*

4,5,6-triaminopyrimidine sulfate (11.1 g.) is dissolved in water (100 ml.) containing 4.0 g. of sodium hydroxide. Sodium bisulfite (5.2 g.) and 1-hydroxy-2-phenylethanesulfonic acid, sodium salt (11.2 g.) are added to the solution and the mixture is heated at 60° C. for 15 minutes. Sodium cyanide (5.0 g.) is added to the mixture containing 1 - [N-(4,6-diamino-5-pyrimidinyl)amino]-2-phenylethanesulfonic acid, and the resulting solution is heated on a water bath for four hours at 60° C. The reaction mixture is cooled and the solid product is collected and recrystallized from ethyl acetate. The product is 2-benzyl-N-(4,6-diamino-5-pyrimidinyl)glycinonitrile; M.P. 170–174° C.

*Example 11*

A solution of 1-hydroxybutanesulfonic acid, sodium salt, prepared by dissolving 4.0 g. of n-butyraldehyde in 40 ml. of water containing 10.4 g. of sodium bisulfite is added to a solution of 11.1 g. of 2,4,5,6-tetraaminopyrimidine bisulfite in 40 ml. of water containing 4.0 g. of sodium hydroxide. The resulting solution containing 1-[N-(2,4,6-triamino-5-pyrimidinyl)amino]-butanesulfonic acid is allowed to stand at room temperature for three hours, sodium cyanide (8.0 g.) is then added and following complete solution, the mixture is allowed to stand in the cold. The solid product which separates on standing, 2 - [(2,4,6 - triamino - 5 - pyrimidinyl)amino]valeronitrile, is collected and dried; M.P. 180–182° C.

*Example 12*

2,4,5,6-tetraaminopyrimidine bisulfite (11.2 g.) is dissolved in water (80 ml.) containing potassium cyanide (6.0 g.). A solution of mandelonitrile (6.6 g.) in 95% ethanol (40 ml.) is added, and the resulting solution is heated to 60° C. and allowed to stand at room temperature for about one hour. The desired product 2-phenyl-N-(2,4,6-triamino-5-pyrimidinyl)glycinonitrile, which separates in crystalline form, is collected by filtration and dried under vacuum; M.P. 153–155° C. after recrystallization from 95% ethanol.

*Example 13*

Aqueous solution of 2-(p-methoxyphenyl)-N-(2,4,6-triamino-5-pyrimidinyl)glycinonitrile monoacetate is neutralized with cold dilute ammonium hydroxide solution. The resulting free base product which separates is collected, dried and taken up in ether. The resulting ethereal solution is treated with a slight excess of hydrogen bromide in ether. The precipitate which separates on standing in the cold is removed by filtration and recrystallized from absolute ethanol. The product is 2-(p-methoxyphenyl)-N-(2,4,6-triamino-5-pyrimidinyl)glycinonitrile hydrobromide.

*Example 14*

To a solution of the free base (2-benzyl-N-(2,4,6-triamino-5-pyrimidinyl)glycinonitrile in methanol is added a solution of an equivalent amount of citric acid in methanol. The resulting mixture is concentrated by removal of the solvent under vacuum at room temperature. The residual product is the citrate salt of the free base starting material. Similarly, other free base products of the invention can be converted by this procedure to their corresponding citrate salts.

We claim:

1. A compound selected from the group consisting of 2-benzyl-N-(4,6-diamino-5-pyrimidinyl)glycinonitrile, 2-phenyl - N - (4,6 - diamino - 5 - pyrimidinyl)glycinonitrile, 2-substituted - N - (2,4,6 - triamino - 5 - pyrimidinyl)glycinonitrile of the formula

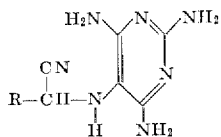

and pharmaceutically acceptable acid addition salts thereof; where R is a member selected from the group consisting of phenyl, (lower)alkylphenyl, (lower)alkoxyphenyl, halophenyl, benzyl and alkyl of 2 to 4 carbon atoms.

2. A pharmaceutically acceptable acid addition salt of 2-phenyl-N-(2,4,6-triamino-5-pyrimidinyl)glycinonitrile.

3. 2 - phenyl - N - (2,4,6 - triamino - 5 - pyrimidinyl)-glycinonitrile monoacetate.

4. 2 - phenyl - N - (2,4,6 - triamino - 5 - pyrimidinyl)-glycinonitrile.

5. 2 - (p - methoxyphenyl) - N - (2,4,6 - triamino - 5-pyrimidinyl)glycinonitrile monoacetate.

6. 2 - (p - isopropylphenyl) - N - (2,4,6 - triamino - 5-pyrimidinyl)glycinonitrile.

7. 2 - (m - tolyl) - N - (2,4,6 - triamino - 5 - pyrimidinyl)glycinonitrile.

8. 2 - benzyl - N - (2,4,6 - triamino - 5 - pyrimidinyl)-glycinonitrile.

9. 2 - benzyl - N - (4,6 - diamino - 5 - pyrimidinyl)-glycinonitrile.

References Cited in the file of this patent

Hickinbottom: Reactions of Organic Compounds (New York, 1948), pages 430–432; 302–303.

Wagner et al.: Synthetic Organic Chemistry (New York, 1953), pages 606–607.

Notice of Adverse Decision in Interference

In Interference No. 94,391 involving Patent No. 3,111,521, M. L. Hoefle and A. Holmes, 2-ARYL-N-(POLYAMINO-5-PYRIMIDINYL)-GLYCINONITRILES, final judgment adverse to the patentees was rendered Nov. 15, 1965, as to claims 2, 3, 4 and 8.

[*Official Gazette February 15, 1966.*]